United States Patent

[11] 3,607,173

| [72] | Inventors | Robert G. McMaster<br>Torrance, Calif.;<br>Stanley W. Joehlin, Curtice, Ohio |
|---|---|---|
| [21] | Appl. No. | 807,328 |
| [22] | Filed | Mar. 14, 1969 |
| [45] | Patented | Sept. 21, 1971 |
| [73] | Assignee | Permaglass, Inc.<br>Millbury, Ohio |

[54] METHOD AND APPARATUS FOR HEAT TREATING SHEETS OF GLASS
27 Claims, 9 Drawing Figs.

[52] U.S. Cl. .................................................. 65/25 A,
    65/114, 65/119, 65/182 A, 65/350, 65/356
[51] Int. Cl. .......................................................... C03b 25/04,
    C03b 29/04
[50] Field of Search ....................................... 65/25 A,
    104, 107, 114, 119, 182 A, 349, 350, 106, 356

[56] References Cited
UNITED STATES PATENTS

| 1,837,311 | 12/1931 | Amsler ........................ | 65/119 |
| 3,332,760 | 7/1967 | McMaster et al. ............ | 65/25 A |
| 3,421,875 | 1/1969 | Kirkman ..................... | 65/25 A |

*Primary Examiner*—Arthur D. Kellogg
*Attorney*—Barnard, McGlynn & Reising

ABSTRACT: A method and apparatus for treating sheets of glass. The apparatus illustrated for carrying out the invention includes an elongated furnace with an elongated support bed disposed in the furnace and having gas inlets to emit gases against the sheet to effect a heat transfer between the sheet and the gases and gas outlets for gases to pass through after contacting the sheet. A plurality of inspirators are spaced along the bed and each inspirator has an opening to draw ambient gases within the furnace thereinto and an exit for directing the gases to the inlets in the bed. A source of pressurized gases is connected through various conduits to the inspirators. The conduits supplying the pressurized gases are disposed in coils in the furnace for heating the pressurized gases prior to the injection thereof into the inspirators.

INVENTORS
Robert G. McMaster,
BY Stanley W. Joehlin
Barnard, McGlynn & Reising
ATTORNEYS INVENTORS
Robert G. McMaster,
BY Stanley W. Joehlin
Barnard, McGlynn & Reising
ATTORNEYS

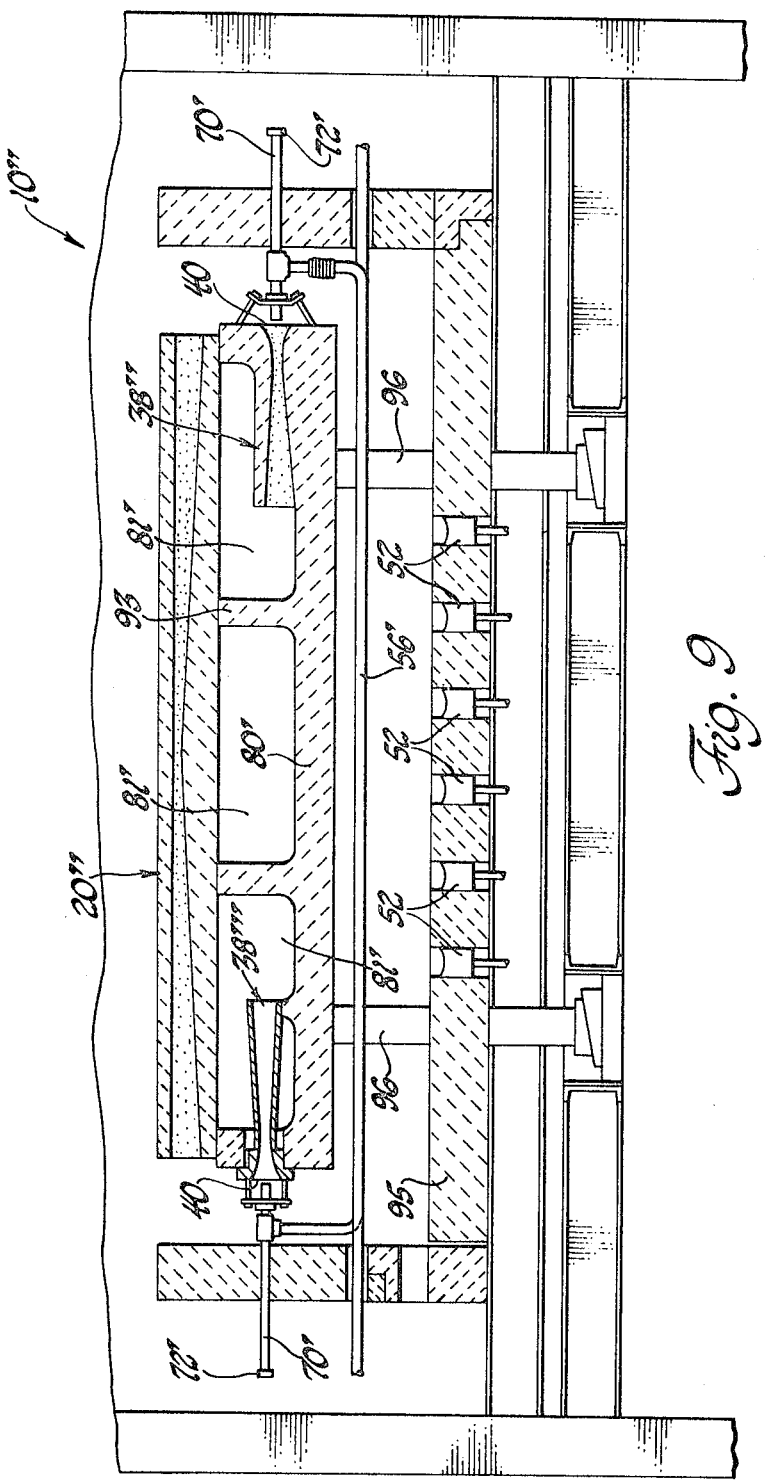

METHOD AND APPARATUS FOR HEAT TREATING SHEETS OF GLASS

This invention relates to a method and apparatus for treating sheets of material such as glass and wherein fluid is directed into contact with the sheet. There are various situations .n which fluid such as a gas is directed into contact with a sheet of material such as glass. Gases are directed against sheets of glass for heating the sheets of glass and gases are directed against sheets of glass for cooling, annealing or tempering a sheet of glass. In some instances a sheet of glass is supported independently of the gases, as by tongs which vertically suspend the sheets. In other instances the sheet of glass may be supported on the gases. The instant invention is related to the movement of such gases into contact with a sheet of material such as glass and has particular utility in moving gases through a support bed over which a sheet of glass is supported as a heat transfer is effected between the sheet and the gases.

To support a sheet of glass on gases over a support bed as the sheet of glass is moved along the support bed while a heat transfer is effected between the sheet and the gases is well known in the prior art. One prior art apparatus for thusly treating a sheet of glass is disclosed and claimed in U.S. Pat. No. 3,223,501 to Fredley et al. Another such apparatus is disclosed in U.S. Pat. No. 3,332,759 to McMaster et al. The Fredley et al. apparatus includes a support bed comprising a plurality of cuplike modules to which gases are supplied for supporting a sheet of glass over the upper extremities of the modules. Hot gases are supplied to the modules as a result of the induction of atmospheric air outside the furnace into blowers which in turn move the cold atmospheric air through gaseous combustion burners and to the modules. After the hot gases pass through the modules and contact the sheet of glass they pass through exhausts or outlets and are dumped to the atmosphere surrounding the furnace. It is very expensive to heat the volume of gases in such a system and a great deal of waste occurs because of the heat dumped to atmosphere. The McMaster et al. apparatus provides an improvement in this regard over the Fredley et al. apparatus because in McMaster et al. the hot gases which have contacted the sheet are reheated and recirculated. This is accomplished by disposing gaseous burners, which provide hot gases, within the furnace and the hot gases are moved by blowers through the inlets in the support bed for contacting and supporting a sheet of glass. The gases which have contacted the sheet move away from the sheet through outlets in the bed which exhaust such gases within the furnace so that they are reheated by the burners and recirculated by the blowers through the support bed. This system requires approximately one-seventh of the gas utilized per square foot of bed in the Fredley et al. apparatus, i.e., the Fredley et al. apparatus utilizes approximately seven times the amount of gas per square foot of bed area as does the apparatus of McMaster et al.

Even though the McMaster et al. apparatus significantly reduces the cost of operation there are other attendant problems as a result of disposing the blowers within the furnace where they are subjected to the hot gases. In the first instance, there is no known commercially available blower which is totally satisfactory for utilization in the McMaster apparatus. Those blowers which are used are very expensive and constantly present maintenance problems. The materials of which available blowers are made, such as stainless steel, present thermal expansion problems when disposed within the heat of the furnace. For example, components associated with the blowers in the furnace are frequently made of nonmetallic materials having different coefficients of thermal expansion than the blowers. In addition, the high rotational speed required of the blowers causes vibration which in turn has caused kinks in the glass in the areas where the glass contacts the conveyor which moves the sheet of glass along the bed. Further, in order to obtain proper operation of the entire furnace available blowers have necessarily been operated beyond their specified upper limits and some have disintegrated due to the attendant centrifugal forces. In addition, the output of the blowers is not always constant and sometimes causes the glass to flutter as it moves along the support bed so as to contact the bed and thereby be scratches.

It is, therefore, an object and feature of this invention to provide a unique and improved method and apparatus for moving fluid into contact with a sheet of material.

In correlation with the foregoing object and feature, it is another object and feature of this invention to provide an improved method and apparatus for heating a sheet of glass with gases in a furnace wherein the gases are reheated and recirculated through the furnace without the attendant and known disadvantages associated with the use of blowers for moving such gases.

In correlation with the foregoing objects and features, it is another object and feature of this invention to provide an improved method and apparatus for moving gases into contact with a sheet of glass by utilizing one or more inspirators.

In correlation with the foregoing objects and features, it is another object and feature of this invention to provide an improved method and apparatus wherein compressed gases supplied to the inspirator are preheated to increase the efficiency thereof.

Another object and feature of this invention is to provide a method of treating a sheet of material such as glass wherein fluid is directed into contact with the sheet by injecting a jet of fluid into a fluid passageway which is in fluid communication with ambient fluid to draw ambient fluid into the passageway and directing the fluid from the passageway into contact with the sheet.

Other objects and attendant advantages of the present invention will be readily appreciated as the same becomes better understood by reference to the following detailed description when considered in connection with the accompanying drawings wherein:

FIG. 9 is a fragmentary cross-sectional view disclosing yet another alternative embodiment of the instant invention and disclosing alternate inspirator constructions.

Figure 1:
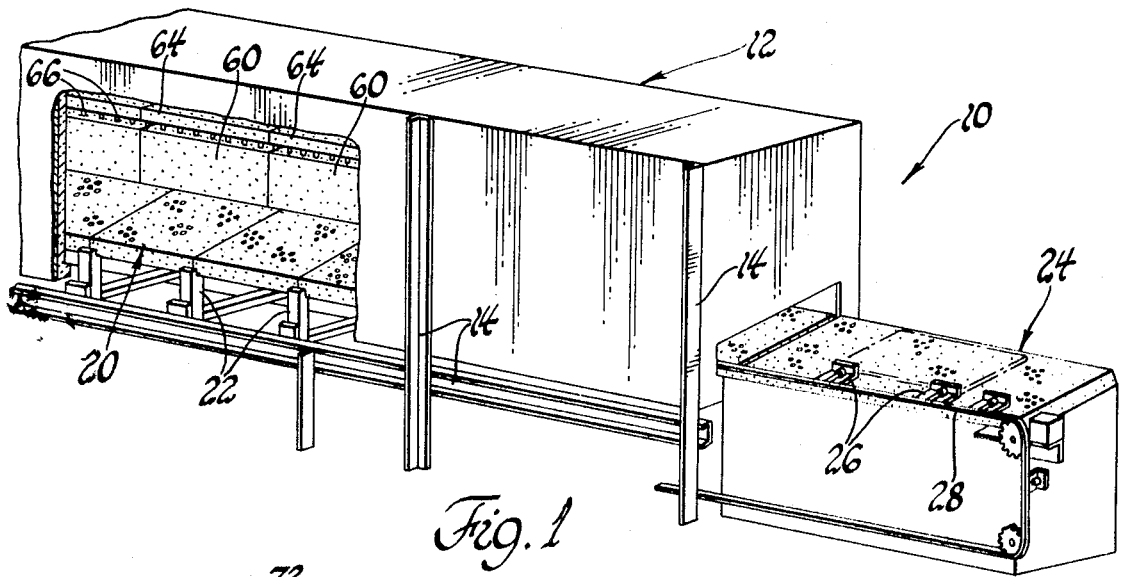
FIG. 1 is a perspective view, with parts broken away, of the preferred apparatus of the instant invention.
Figure 2:
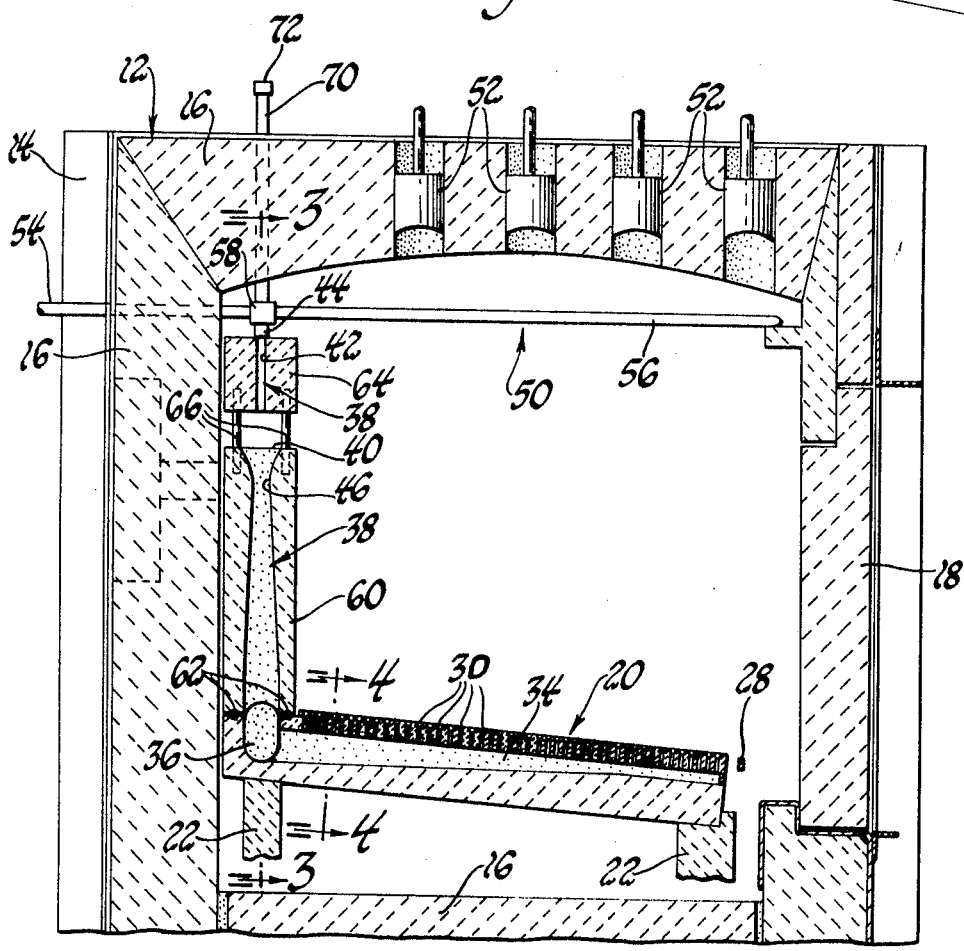
FIG. 2 is a fragmentary cross-sectional view of the embodiment illustrated in FIG. -.
Figure 3:
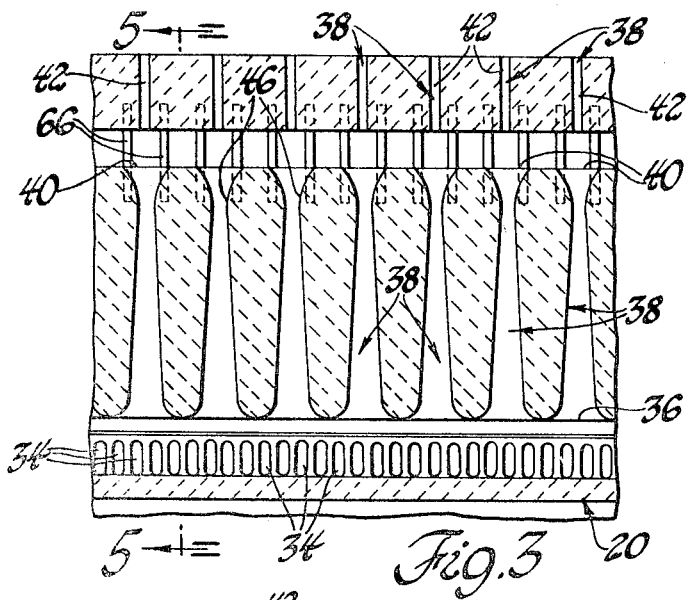
FIG. 3 is a fragmentary cross-sectional view taken substantially along line 3—3 of FIG. 2.
Figure 4:
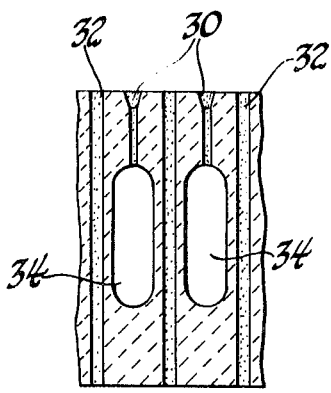
FIG. 4 is an enlarged fragmentary cross-sectional view taken substantially along line 4—4 of FIG. 2.
Figure 5:
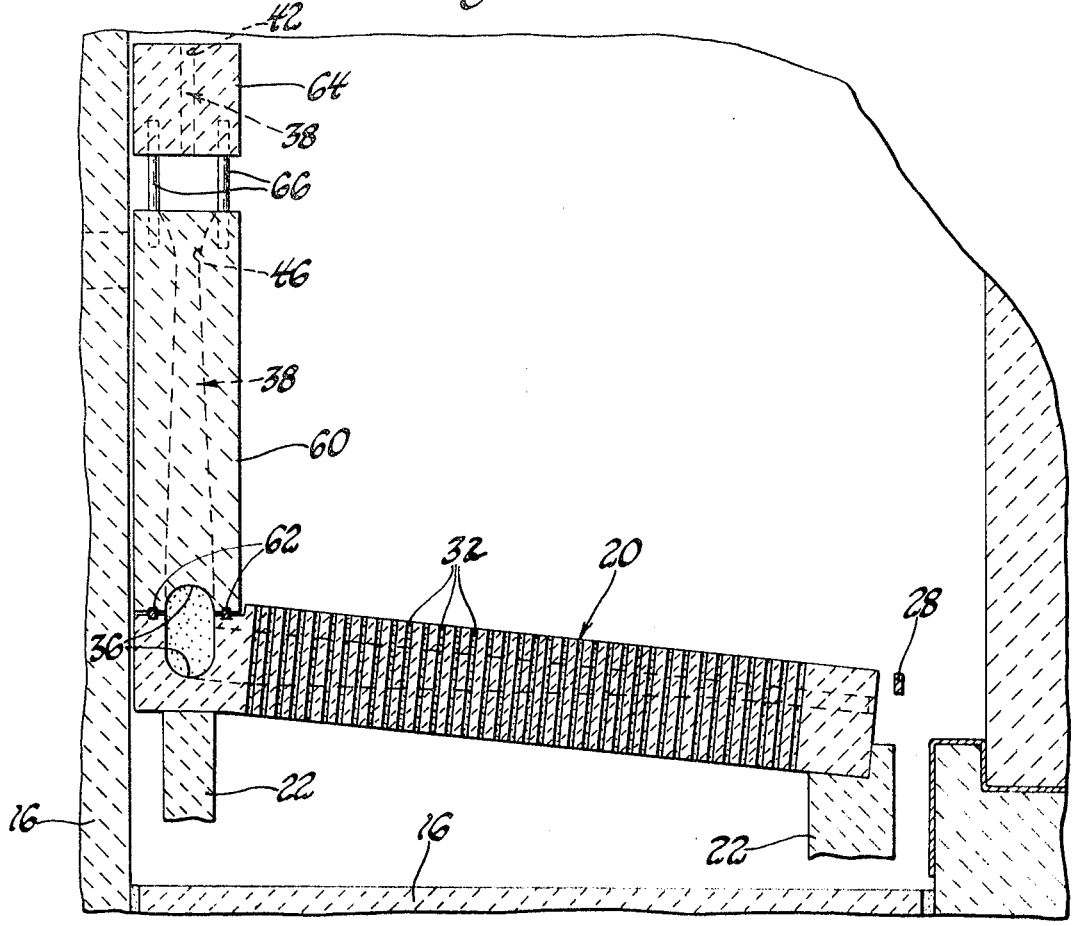
FIG. 5 is a fragmentary cross-sectional view taken substantially along line 5—5 of FIG.0.

Referring now to the drawings wherein like numerals indicate like or corresponding parts throughout the several views, various embodiments of apparatii constructed in accordance with the instant invention are respectively generally shown at 10, 10' and 10''. Each apparatus treats a sheet of material such as glass and includes means for directing fluid such as gases into contact with the sheet and for supporting the sheet.

Referring first to the embodiment illustrated in FIGS. 1 through 5, the apparatus 10 includes an enclosure or furnace generally indicated at 12. The furnace 12 includes various structural support members 14 and may include additional support members depending upon the particular design. The walls of the furnace are made of pieces of insulating fire brick 16 and may or may not include one or more doors as indicated at 18.

There is included a gas support bed generally indicated at 10 and supported within the furnace 12 by the members 22. The bed 20 is preferably of the type disclosed in the aforementioned U.S. Pat. No. 3,332,759 and is made of a ceramic-type material having an extremely low coefficient of thermal expansion as well as excellent heat shock resistance. The bed may be formed of a plurality of blocks each of which has a width equal to the width of the bed and abuts adjacent blocks. The bed 20 extends out of the furnace 12 to a loading station generally indicated at 24 where a sheet of glass is placed upon the bed That portion of the bed in the loading station 24 may or may not be made of ceramic. The bed 20 is disposed at an angle to the horizontal so that sheets of glass supported on gases thereover have a component of force urging them against conveyor pads 26 which are moved along the bed by the conveyor chain 28. Such a conveyor is more specifically described in the aforementioned U.S. Pat. No. 3,332,759. The bed 20 has a plurality of gas inlets 30 therein to emit gases for contacting the sheet of glass to effect a heat transfer station between the sheet and the gases emitted from the inlets 30. In addition, there are outlets or exhausts 30 along at least a portion of the bed for gases to pass through after being emitted from the inlets 32. The bed 20 includes plenum chamber means comprising a plurality of plenum chambers 34 all of which in turn form part of a flow control means for directing gases to and through the inlets 30 in the bed. There is also a header or manifold passage 36 which extends along the bed and forms a part of the flow control means for directing the gases to the inlets 30.

A plurality of inspirators, each of which is generally indicated at 38, are spaced along the bed 20. Each inspirator 38 includes a fluid passageway means having an opening 40 therein in fluid communication with the ambient gases within the furnace enclosure. The opening 40 is at one end of each passageway means and the opposite end of each passageway means has an exit in communication with the header or manifold passage 36. Each inspirator 38 also includes an injection means comprising a nozzle passage 42 for directing a jet of gases into the passageway means to draw ambient gases from the furnace into the passageway means through the opening 40. As gases are injected into the opening 40 of the passageway means by the nozzle passage 42, ambient gases within the furnace are drawn through the opening 40 and through the passageway means. The header or manifold passage 36 and the plenum chambers 34 define a flow control means for directing the gases from the exit of the passageway means of each inspirator to and through the inlets 30 and into contact with a sheet of glass disposed over the bed 20.

There is included a source of pressurized gases which terminates in a conduit 44 which is in fluid communication with the nozzle passage 42 of the injection means of each inspirator 38. Pressurized gases may be supplied through the conduit 44 by one or more compressors, or the like. Each passageway means includes a restriction or throat 46 and decreases in cross-sectional area from the opening 40 to the throat 46 and increases in cross-sectional area from the throat to the exit thereof. Thus, as ambient gases are drawn into the passageway means, the velocity thereof is increased and once through the throat 46 the velocity is reduced or decreased by expanding the volume of the gases As illustrated, the maximum velocity of the gases should be in the throat 46. Thus, the ambient gases are drawn into the passageway means at the opening 40 which is upstream of the maximum velocity of flow.

There is also included a heating means generally indicated at 50 for heating the pressurized gases before they are injected by the nozzle passage 42 into the passageway means through the opening 40 thereof. Such heating means comprises a plurality of combustion gaseous burners 52 disposed in the roof of the furnace for supplying hot gases adjacent the roof thereof. The pressurized gases enter the furnace through a conduit 54 which extends into coils of conduit 56 which terminate in a junction 58 for supplying the pressurized gases through the conduit 44 to the nozzle passage 42. The coils of conduit 56 define circulating means for circulating the pressurized gases through the furnace enclosure in a flow separate from the ambient gases therein for heating of the pressurized fluid by the burners 52. It will be apparent, therefore, that the burners 52 simultaneously heat the pressurized gases and the ambient gases within the furnace enclosure. Thus, the burners 52 are also heating means for heating the ambient gases within the furnace enclosure. It will be readily appreciated, however, that although the same heating means is utilized to heat both the ambient gases and the pressurized gases, separate heating means may be utilized for heating the pressurized gases upstream or prior to their being supplied to the various inspirators.

In the embodiment of FIGS. 1 through 5 as well as one alternative embodiment of FIG. 9 which will be more clear hereinafter, the passageway means of each inspirator is disposed in a ceramic material and the ceramic material of which the bed is made and the ceramic material defining the passageways have substantially equal coefficients of thermal expansion for maintaining alignment during different temperature conditions. More specifically, the passageway means of more than one inspirator 38 are disposed in a first integral, unitary ceramic member or block as indicated at 60, a plurality of such members 60 being illustrated in FIG. 1. Each ceramic member 60 is in sealing relationship with the bed 20 by the seals 62. In a like manner, each nozzle passage 42 is disposed in ceramic material and the nozzle passages 42 of more than one inspirator are disposed in a second integral ceramic member or block, a plurality of which are respectively indicated by the members 64. Each of the first ceramic members 60 and the passageway means defined thereby extend upwardly from the bed 20 adjacent one extremity of the bed and means preferably comprising quartz rods 66 interconnect the ceramic members 60 and 64 and support the second ceramic members 64 in spaced relationship and above the first ceramic members 60 thereby to provide ingress for ambient gases into the opening 40 of each inspirator.

The burners 52 are disposed in the roof and, therefore, the hotter gases are adjacent the roof. The inspirators extend upwardly from the bed so that the hotter ambient gases in the upper regions of the furnace enclosure are drawn into the passageway means through the openings 40 thereof.

A conduit 70 extends upwardly from the coupling 58 in the nozzle passage 42 of the injection means and through the roof to a selectively capped upper end 72. The conduit 70 provides a means for cleaning out the nozzle passageway 42 and also provides an alignment device to maintain the nozzle passage 42 in proper alignment with the opening 40.

As it will be appreciated, therefore, the apparatus illustrated in FIGS. 1 through 5, which has been constructed in accordance with the instant invention, may perform a method of treating a sheet of material such as glass wherein fluid is directed into contact with the sheet by injecting a jet of fluid into a fluid passageway which is in fluid communication with ambient fluid to draw the ambient fluid into the passageway and thereafter directing the fluid from the passageway into contact with the sheet. Additionally, there is effected a transfer of heat between the sheet and the fluid as the burners 52 heat the ambient fluid within the furnace enclosure. Pressurized fluid is injected into the opening 40 of the fluid passageway to draw ambient air thereinto and in the preferred embodiment, the pressurized fluid is heated before it is injected into the fluid passageway. It will be noted that the exhaust passages 32 extend downwardly through the bed to allow the gases or at least a major portion thereof to be retained within the furnace enclosure for reheating and recirculation.

It will be understood that the dimensions of the inspirators and temperatures of the gases will vary depending upon the parameters required in each given insulation, as for instance, the width of the support bed 20 and the restriction of the gas flow therethrough. The importance of heating the pressurized gases has been proven in one assembly where the efficiency ratio was increased from approximately 13.5:1 to approximately 21.2:1 by heating the compressed air to 1200°.

Figure 6:
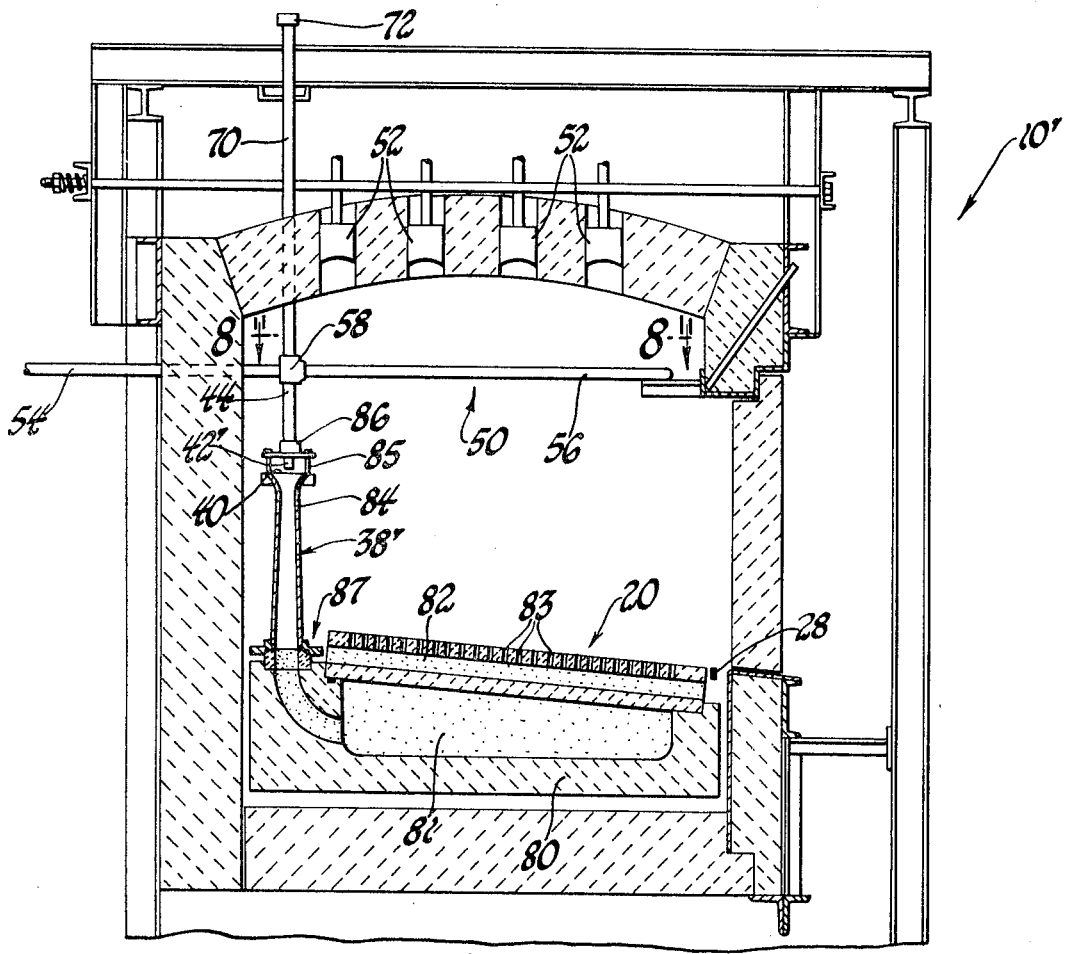
FIG. 6 is a fragmentary cross-sectional view similar to FIG. 2 but showing an alternative embodiment of the instant invention.
Figure 7:
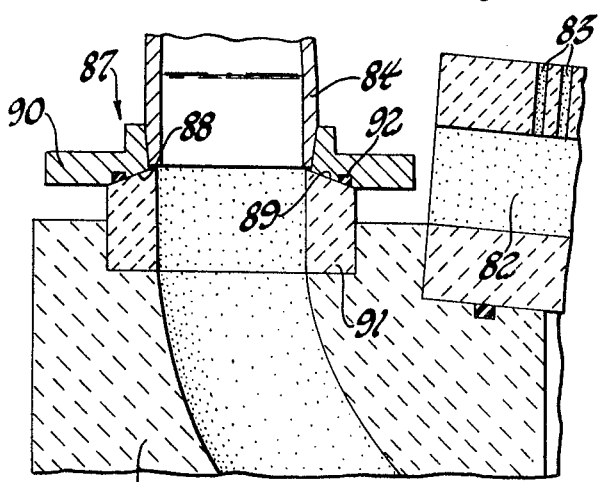
FIG. 7 is an enlarged fragmentary cross-sectional view disclosing the seal utilized in conjunction with the inspirator of the embodiment of FIG. 6.
Figure 8:
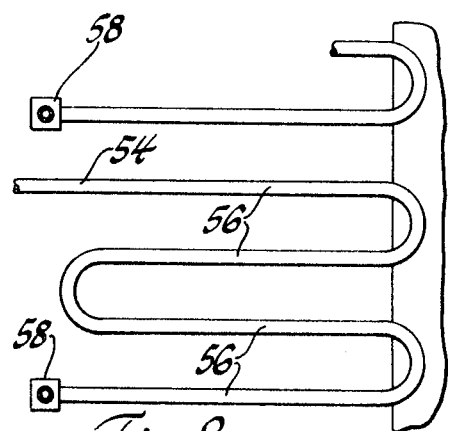
FIG. 8 is a fragmentary view taken substantially along line 8—8 of FIG. 6.

Turning now to the embodiment of FIGS. 6 and 7. The embodiment of FIGS. 6 and 7 differs from that of the previously described embodiment in the construction of the support bed and of the inspirators. In the embodiment of FIG. 6 the bed 20′ is supported by a ceramic member 80 and coacts therewith to define a plenum chamber means 81. The member 80 may be considered a part of the support bed. Although not shown, the inlet passages in the bed 20 extend completely therethrough to communicate with the plenum chamber means 81 and the upper extremity or surface of the bed 20. The bed 20 in the embodiment of FIGS. 6 and 7 has a cross or discharge passage 82 which communicates with outlet or exhaust passages 83. The inspirators 38′ of FIGS. 6 and 7 are defined by metal members. The passageway means of each inspirator 38′ is defined by a metal venturilike member 84 which has bolts, studs, or the like, 85 extending upwardly from the upper opening 40 thereof to support a plate 86 which in turn supports the nozzle passage 42′.

There is also included sealing means generally indicated at 87 between the metal member 84 and the ceramic member 80 for compensating for the difference in thermal expansion therebetween. The sealing means 87 includes a pair of spherical coacting surfaces 88 and 89 as defined by the female plate member 90, which is secured to the lower extremity of the metal member 84, and the male member 91, which is supported by the member 80. A seal 92 is also provided. Again, in the embodiment of FIGS. 6 and 7, each inspirator 38′ extends upwardly from the support bed 20 to take advantage of drawing thereinto the hotter gases in the upper regions of the furnace enclosure.

As alluded to previously, there are alternative embodiments disclosed in FIG. 9. The support bed 20″ of FIG. 9 is like the bed in the embodiment of FIGS. 6 and 7 in that it is supported by a ceramic member 80′ which coacts therewith to define plenum chamber means 81′. The upper extensions 93 may be in the form of spaced posts. In FIG. 9 the passageway means of the inspirators are disposed generally horizontally below the upper extremity of the bed 20″. The inspirator 38″ shown to the right of FIG. 1 is like the inspirator in the embodiment of FIG. 1 in that it is defined by a ceramic member whereas the inspirator 30‴ is like the inspirator in the embodiment of FIG. 6 in that it is defined by a metal member. Although the inspirators 38″ and 38‴ are shown as alternatives in FIG. 9, in actuality in building such an apparatus with inspirators along each side of the support bed, all inspirators would either be of the integral ceramic type 38″ or the metal type 38‴.

In the embodiment of FIG. 9 the heating means comprising the burners 52 are disposed in the floor 95 of the furnace enclosure for supplying heat adjacent the floor 95. The bed assembly is supported by the members 96 in spaced relation to and above the floor 95. The inspirators of the assembly of FIG. 9 are disposed horizontally and below the upper extremity of the bed whereby the hotter ambient gases in the lower regions of the furnace enclosure are drawn into the inspirators through the openings 40 thereof. There is also included in the embodiment of FIG. 9 circulating means comprising the conduit coils 56′ for circulating pressurized gases beneath the bed for heating thereof by the burners 52. The inspirators shown in FIG. 9 also include clean out and alignment conduits 70′ including removable caps 72′.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A method of treating a sheet of glass wherein the sheet is supported on gases over a bed supported in an enclosure with gas inlets therein and plenum chamber means in fluid communication with the inlets, comprising the steps of; injecting a jet of pressurized gases into a fluid passageway open to ambient gases within the enclosure in a manner to inspirate the ambient gases into the passageway, directing the gases from the passageway into the plenum chamber means for supplying the inlets in the bed, heating the ambient gases within the enclosure and heating the pressurized gases before being injected into the passageway.

2. A method as set forth in claim 1 including circulating the gases under pressure through the enclosure in a flow separate from the ambient gases for heating thereof simultaneously with the heating of the ambient gases and by the same heating means.

3. A method as set forth in claim 2 including retaining a major portion of the gases emitted from the inlets within the enclosure for reheating thereof and recirculation through the passageway.

4. An apparatus for treating a sheet of glass comprising; an enclosure, a bed supported in said enclosure and having gas inlets therein, said bed including at least one plenum chamber means in fluid communication with said inlets, fluid passageway means having an opening in communication with ambient gases within said enclosure and an exit in communication with said plenum chamber means, a source of pressurized gases for providing gases for injection of a jet into said passageway means to inspirate ambient gases into said passageway means through said opening and into said plenum chamber means for supplying gases to said inlets, and heating means for heating the ambient gases within said enclosure and for heating the pressurized gases before being injected into said fluid passageway means.

5. An apparatus as set forth in claim 4 wherein said fluid passageway means includes a throat and decreases in cross-sectional area from said opening to said throat and increases in cross-sectional area from said throat to said exit.

6. An apparatus as set forth in claim 4 including circulating means for circulating said pressurized gases through said enclosure in a flow separate from said ambient gases for heating thereof by said heating means simultaneously with the heating of said ambient gases.

7. An apparatus as set forth in claim 6 wherein said heating means includes a plurality of combustion burners and said circulating means includes coils of conduit.

8. An apparatus as set forth in claim 4 wherein said bed is made of a ceramic material and includes said plenum chamber means, and wherein said passageway means and said injection means define an inspirator, and including a plurality of said inspirators in communication with said plenum chamber means.

9. An apparatus as set forth in claim 8 wherein said passageway means are disposed in a ceramic material.

10. An apparatus as set forth in claim 9 wherein said ceramic materials of said bed and defining said passageway means have substantially equal coefficients of thermal expansion.

11. An apparatus as set forth in claim 10 wherein said passageway means of more than one inspirator are disposed in a first integral ceramic member.

12. An apparatus as set forth in claim 11 wherein said first ceramic member is in sealing relationship with said bed.

13. An apparatus as set forth in claim 12 wherein each injection means is defined by a nozzle passage disposed in ceramic material.

14. An apparatus as set forth in claim 13 wherein said nozzle passages of more than one inspirator are disposed in a second integral ceramic member.

15. An apparatus as set forth in claim 14 wherein said first ceramic member and said passageway means defined thereby extend upwardly from said bed adjacent one extremity of said bed, and means interconnecting said ceramic members and supporting said second ceramic member in spaced relationship and above said first ceramic member.

16. An apparatus as set forth in claim 12 wherein said bed is supported by said first ceramic member and coacts therewith to define said plenum chamber means.

17. An apparatus as set forth in claim 16 wherein said passageway means defined by said first ceramic member extend generally horizontally below the upper extremity of said bed.

18. An apparatus as set forth in claim 8 wherein each of said passageway means is defined by a metal member.

19. An apparatus as set forth in claim 18 including sealing means between each metal member and said ceramic bed for compensating for the difference in thermal expansion therebetween.

20. An apparatus as set forth in claim 19 wherein said means includes a pair of spherical coacting surfaces.

21. An apparatus as set forth in claim 19 wherein each of said metal members extends upwardly from said bed adjacent one extremity of said bed.

22. An apparatus as set forth in claim 19 wherein each of said metal members extends generally horizontally.

23. An apparatus as set forth in claim 4 wherein said enclosure includes a roof and said heating means supplies heat adjacent said roof, said passageway means extends upwardly from said bed whereby the hotter ambient gases in the upper regions of said enclosure are drawn into said passageway means through said opening thereof.

24. An apparatus as set forth in claim 23 including a conduit extending upwardly from said injection means and through said roof to a selectively capped upper end.

25. An apparatus as set forth in claim 23 including coils of conduit supported in said enclosure adjacent said roof for circulating said pressurized gases through said enclosure in a flow separate from said ambient gases for heating thereof by said heating means simultaneously with the heating of said ambient gases.

26. An apparatus as set forth in claim 4 wherein said enclosure includes a floor and said heating means supplies heat adjacent said floor, said bed being supported in spaced relation to and above said floor, said passageway means extends generally horizontally and below the upper extremity of said bed whereby the hotter ambient gases in the lower regions of said enclosure are drawn into said passageway means through said opening thereof.

27. An apparatus as set forth in claim 26 including a conduit extending horizontally from said injection means and through said enclosure to a selectively capped end.